United States Patent
Roetzer et al.

(10) Patent No.: US 10,693,398 B2
(45) Date of Patent: Jun. 23, 2020

(54) METHOD FOR ADJUSTING AN AMPLITUDE OF A VOLTAGE INJECTION OF A ROTATING, MULTI-PHASE ELECTRIC MACHINE, WHICH ELECTRIC MACHINE IS FED BY MEANS OF A PWM-CONTROLLED INVERTER

(71) Applicant: Robert Bosch GmbH, Stuttgart (DE)

(72) Inventors: Marco Roetzer, Epfendorf (DE); Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/308,808

(22) PCT Filed: Apr. 26, 2017

(86) PCT No.: PCT/EP2017/059900
§ 371 (c)(1),
(2) Date: Dec. 10, 2018

(87) PCT Pub. No.: WO2017/215822
PCT Pub. Date: Dec. 21, 2017

(65) Prior Publication Data
US 2019/0312535 A1 Oct. 10, 2019

(30) Foreign Application Priority Data
Jun. 13, 2016 (DE) .......... 10 2016 210 443

(51) Int. Cl.
*H02P 21/24* (2016.01)
*H02P 6/18* (2016.01)
(52) U.S. Cl.
CPC .............. *H02P 6/183* (2013.01); *H02P 21/24* (2016.02)

(58) Field of Classification Search
CPC .............. H02P 6/18; H02P 6/181–183; H02P 6/185–186; H02M 21/13; H02M 21/18; H02M 21/26; H02M 21/32
See application file for complete search history.

(56) References Cited

U.S. PATENT DOCUMENTS

2008/0055955 A1* 3/2008 Tamai ................ H02M 5/27
363/163
2009/0039810 A1* 2/2009 Gotz ................. H02P 6/181
318/400.32
(Continued)

FOREIGN PATENT DOCUMENTS

DE   11 2009 001 975 T5   7/2011
JP   2008-167630 A   7/2008
(Continued)

OTHER PUBLICATIONS

International Search Report corresponding to PCT Application No. PCT/EP2017/059900, dated Oct. 4, 2017 (German and English language document) (5 pages).

(Continued)

*Primary Examiner* — Rina I Duda
(74) *Attorney, Agent, or Firm* — Maginot, Moore & Beck LLP

(57) ABSTRACT

A method for adjusting an amplitude of a voltage injection of a rotating, multi-phase electric machine that is fed using a PWM-controlled inverter includes determining, at a first time, a predetermined current vector that would be present at the machine at a second time using a voltage equation of the machine based on a voltage predetermined in a controller for actuating the machine, a current vector determined from phase currents measured at the first time, and a speed of the (Continued)

machine. The method further includes determining a real current vector present at the machine at the second time based on phase currents of the machine measured at the second time and calculating a current vector difference between the predetermined current vector and the real current vector at the second time. The method further includes adjusting the amplitude of the voltage injection based on the calculated current vector difference.

6 Claims, 1 Drawing Sheet

(56) References Cited

U.S. PATENT DOCUMENTS

| | | | | |
|---|---|---|---|---|
| 2012/0146626 | A1* | 6/2012 | Bieler | H02P 6/182 |
| | | | | 324/207.16 |
| 2012/0268046 | A1* | 10/2012 | Yamazaki | H02P 21/18 |
| | | | | 318/400.02 |
| 2014/0225548 | A1* | 8/2014 | Xu | H02P 6/183 |
| | | | | 318/400.33 |
| 2014/0327379 | A1* | 11/2014 | Yang | H02P 6/18 |
| | | | | 318/400.02 |
| 2016/0149443 | A1 | 5/2016 | Hashimoto et al. | |

FOREIGN PATENT DOCUMENTS

| | | |
|---|---|---|
| JP | 2011-199998 A | 10/2011 |
| WO | 2011/129423 A1 | 10/2011 |

OTHER PUBLICATIONS

Taniguchi, Shun, et al.,Control Method for Harmonic Voltage Injection to Achieve Noise Reduction in Position-Sensorless Control of Permanent-Magnet Synchronous Motors at Low Speeds, Electrical Engineering in Japan, vol. 179, No. 3, 2012. [ages 49-56.
Tauchi, Yuki, et al.,Audible Noise Reduction Method in IPMSM Position Sensorless Control based on High-Frequency Current Injection, The 2014 International Power Electronics Conference, Japan, pp. 3119-3123.

* cited by examiner

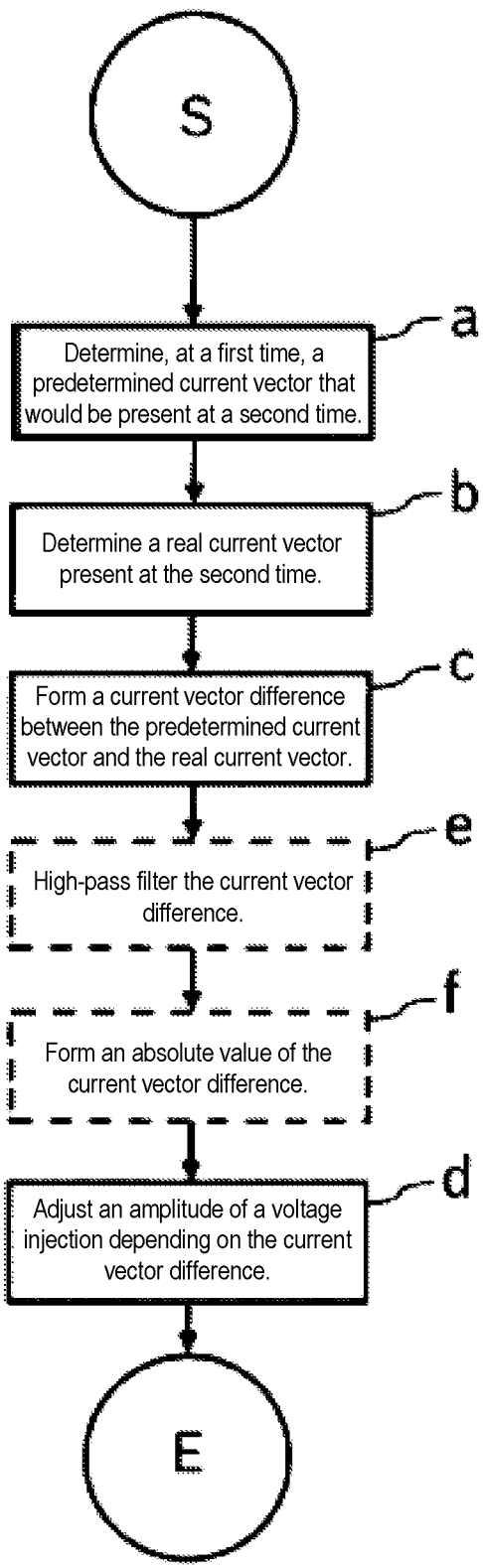

METHOD FOR ADJUSTING AN AMPLITUDE OF A VOLTAGE INJECTION OF A ROTATING, MULTI-PHASE ELECTRIC MACHINE, WHICH ELECTRIC MACHINE IS FED BY MEANS OF A PWM-CONTROLLED INVERTER

This application is a 35 U.S.C. § 371 National Stage Application of PCT/EP2017/059900, filed on Apr. 26, 2017, which claims the benefit of priority to Serial No. DE 10 2016 210 443.8, filed on Jun. 13, 2016 in Germany, the disclosures of which are incorporated herein by reference in their entirety.

BACKGROUND

The disclosure relates to a method for adjusting an amplitude of a voltage injection in a determination of a rotor position of a rotating, multi-phase electric machine which is fed by means of a PWM-controlled inverter by way of an anisotropy-based method.

Such a method is disclosed for example in the article "Audible Noise Reduction Method in IPMSM Position Sensorless Control based on High-Frequency Current Injection" by Yuki Tauchi et al., which was published in 2014 at the "International Power Electronics Conference" of the IEEE. It is possible by means of the adjustment of the amplitude of the voltage injection to influence the signal-to-noise ratio of the ascertained rotor position. In the case of fast speed changes it is necessary to reduce the filter time constant of the rotor position determination, such that the calculated rotor position follows the real rotor position without too much of the delay. In order that the calculated rotor position is nevertheless not too noisy, the signal-to-noise ratio must be improved by increasing the amplitude of the voltage injection. Accordingly it is possible in the case of a constant speed of the machine to increase the filter time constant, as a result of which the signal-to-noise ratio is improved. It is thus also possible to decrease the amplitude of the voltage injection. In the article mentioned, for adjusting the amplitude of the voltage injection, the deviation between a target speed and an actual speed of the electric machine is determined, and the amplitude of the high-frequency voltage injection is adjusted in dependence on said deviation.

In the case of sensorless control, an attempt is made to ascertain the rotor position of an electric machine without using a position sensor. So called anisotropy-based methods can be used here, which determine the rotor position via the magnetic anisotropy of the rotor. In the case of these anisotropy-based methods, in addition to the injection of a voltage to be set for the electric machine, a high-frequency voltage injection also takes place, which results in a high-frequency current change in the phase currents of the electric machine. This current change contains information relating to the rotor position and consequently it is possible to determine the rotor position from the current change via a suitable model approach.

SUMMARY

The disclosure relates to a method for adjusting an amplitude of a voltage injection of a rotating, multi-phase electric machine that is fed by means of a PWM-controlled inverter, having at least the following method steps:

a. determining at a first time a predetermined current vector that would be present at the machine at a second time, by way of a voltage equation of the electric machine, in dependence on a voltage predetermined in a controller for actuating the electric machine, a current vector determined from phase currents measured at the first time, and a speed of the machine, wherein the first time is located before the second time, b. determining a real current vector present at the machine at the second time in dependence on phase currents of the machine measured at the second time, c. forming a current vector difference between the predetermined current vector and the real current vector at the second time, d. adjusting the amplitude of the voltage injection in dependence on the current vector difference formed.

It is an advantage here that the current vector difference correlates with the deviation between the calculated and actual rotor position of the machine, wherein this deviation becomes greater in particular in the case of fast speed changes. By way of the adjustment of the amplitude of the voltage injection, the signal-to-noise ratio can be influenced, and as a consequence it is possible to react by way of the method to the dynamics of the electric machine. Due to the adjustment of the amplitude, the signal-to-noise ratio of the ascertained rotor position can be sufficiently good and at the same time it is possible to keep the noise generation from the voltage injection as low as possible. In addition, the adjustment of the amplitude of the voltage injection is effected within a few sampling steps of the control of the electric machine, as a result of which the method is also suitable for highly dynamic systems.

In an advantageous configuration of the method according to the disclosure, provision is made for the amplitude of the voltage injection in method step d to be adjusted such that, the more the current vector difference deviates from zero, the greater the amplitude of the voltage injection is selected. It is advantageous here that it is possible to react to the dynamics of the electric machine. It is thus necessary in the case of fast speed changes to reduce the filter time constant in the anisotropy-based method, such that the calculated rotor position follows the real rotor position without too much of a delay. The magnitude of the current vector difference here correlates with the magnitude of the speed change of the machine and also with the deviation between the calculated and the real rotor position of the electric machine. It is thus possible in the case of a great current vector difference to deduce a fast speed change, and the filter constant of the anisotropy-based method should be reduced. In order that the signal-to-noise ratio nevertheless remains sufficiently good to perform a determination of the rotor position of the electric machine that is as exact as possible, the amplitude of the voltage injection is increased. If, on the other hand, a slow speed change is ascertained, that is to say a small current vector difference, the filter constant can be increased, which is why even a voltage injection with a small amplitude is sufficient for a good signal-to-noise ratio. Owing to the small amplitude, it is possible to keep the noise generation due to the rotor position calculation as low as possible.

In accordance with an advantageous configuration of the method according to the disclosure, provision is made for a method step e, in which the current vector difference is high-pass filtered, to be performed between the method step c and the method step d.

It is advantageous here that the amplitude of the voltage injection is not adjusted on the basis of model errors. For example, it is possible even without a change in speed for a current vector difference to arise due to model errors, which would otherwise result in an adjustment of the amplitude of the voltage injection.

According to a further advantageous configuration of the method according to the disclosure, provision is made for a method step f, in which the absolute value of the current vector difference is formed, to be performed between the method step c and the method step d.

It is advantageous here for it to be possible to react identically both to a negative and to a positive current vector difference and for the amplitude of the voltage injection to be adjusted accordingly for both cases.

BRIEF DESCRIPTION OF THE DRAWINGS

FIG. 1 shows an exemplary embodiment of the method according to the disclosure for adjusting an amplitude of a voltage injection of a rotating, multi-phase electric machine that is fed by means of a PWM-controlled inverter.

DETAILED DESCRIPTION

FIG. 1 shows an exemplary embodiment of the method according to the disclosure for adjusting an amplitude of a voltage injection of a rotating, multi-phase electric machine that is fed by means of a PWM-controlled inverter. This method can be used in particular in an anisotropy-based method, which determines the rotor position of a rotating, multi-phase electric machine that is fed by means of a PWM-controlled inverter, that is to say a three-phase motor. In the method according to the disclosure, determined in a method step a, at a first time, is a predetermined current vector that would, at a second time, be present at a rotating, multi-phase electric machine that is fed by means of a PWM-controlled inverter.

The predetermined current vector is determined by means of a voltage equation of the electric machine. This determination is performed in dependence on a voltage predetermined in a controller for actuating the electric machine, a current vector determined from phase currents measured at the first time, and a speed of the machine. The current vector here represents the transformed phase currents of the electric machine. Subsequently, in a method step b, a real current vector present at the machine at the second time is determined. In this case, the phase currents of the electric machine are measured, and the real current vector is determined herefrom by way of a transformation. In a method step c, a current vector difference is formed from the predetermined current vector and the real current vector. This can be realized, for example, by guiding the current vector predetermined at the first time via a delay element, which bridges the interval between the first time and the second time, and guiding it then, at the second time, together with the real current vector at the second time to a subtraction node, which forms the current vector difference. Next, in a method step d, the amplitude of the voltage injection is adjusted in dependence on the current vector difference formed previously. This can be effected for example by determining from the current difference a factor which is additionally included in the modulation of the voltage injection, which is typically modulated in dependence on the calculated rotor position. Next, the method is terminated. Optionally, a method step e or also a method step f is performed between the method step c and the method step d. In method step e, the current vector difference is high-pass filtered. In method step f, the absolute value of the current vector difference is formed, which represents the length of the current vector difference. It is additionally possible in method step d to adjust the filter properties of an angle observer of the anisotropy-based method to the amplitude of the voltage injection to determine the rotor position. The method can be restarted, for example for each new sampling step of the control of the electric machine, as a result of which the methods run in parallel.

The invention claimed is:

1. A method for adjusting an amplitude of a voltage injection into an electric machine, the electric machine being of a multi-phase motor that is actuated by a PWM-controlled inverter, the method comprising:
   determining, at a first time, a predicted current vector that represents phase currents that will flow through the electric machine at a second time, the predicted current vector being determined using a voltage equation of the electric machine that depends on (i) an actuating voltage that actuates the electric machine, (ii) a first real current vector determined based on phase currents of the electric machine measured at the first time, and (iii) a speed of the electric machine, wherein the first time occurs before the second time;
   determining a second real current vector based on phase currents of the electric machine measured at the second time;
   calculating a current vector difference between the predicted current vector and the second real current vector;
   adjusting the amplitude of the voltage injection based on the calculated current vector difference; and
   determining a rotor position of a rotor of the electric machine based on a current change in phase currents of the electric machine that results from the voltage injection.

2. The method as claimed in claim 1, the adjusting the amplitude of the voltage injection further comprising:
   adjusting the amplitude of the voltage injection by selecting the amplitude of the voltage injection, such that the more the calculated current vector difference deviates from zero, the greater the amplitude of the voltage injection is selected.

3. The method as claimed in claim 1, further comprising:
   filtering the calculated current vector difference with a high-pass filter after calculating the current vector difference and before adjusting the amplitude of the voltage injection.

4. The method as claimed in claim 1, further comprising:
   determining an absolute value of the calculated current vector difference after calculating the current vector difference and before adjusting the amplitude of the voltage injection.

5. The method as claimed in claim 1, the determining the rotor position further comprising:
   determining the rotor position based on the current change using an anisotropy-based calculation.

6. The method as claimed in claim 5, the determining the rotor position further comprising:
   adjusting a filter property of the anisotropy-based calculation based on the amplitude of the voltage injection.

* * * * *